(12) United States Patent
Crudgington

(10) Patent No.: US 8,690,160 B2
(45) Date of Patent: *Apr. 8, 2014

(54) BRUSH SEAL ASSEMBLY

(75) Inventor: Peter Francis Crudgington, Freshford (GB)

(73) Assignee: Cross Manufacturing Company (1938) Limited, Avon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,196

(22) Filed: Mar. 29, 2012

(65) Prior Publication Data

US 2012/0187635 A1    Jul. 26, 2012

Related U.S. Application Data

(63) Continuation of application No. 13/020,835, filed on Feb. 4, 2011, now Pat. No. 8,191,898, which is a continuation of application No. 12/091,199, filed as application No. PCT/GB2007/003694 on Oct. 1, 2007, now Pat. No. 7,950,671.

(60) Provisional application No. 60/849,324, filed on Oct. 4, 2006.

(30) Foreign Application Priority Data

Oct. 3, 2006  (GB) .................................. 0619488.0

(51) Int. Cl.
*F16J 15/44*    (2006.01)

(52) U.S. Cl.
USPC ......................................................... 277/355

(58) Field of Classification Search
USPC ......................................................... 277/355
See application file for complete search history.

(56) References Cited

U.S. PATENT DOCUMENTS

| 5,090,710 A * | 2/1992 | Flower ........................... 277/355 |
| 5,794,938 A * | 8/1998 | Hofner et al. .................. 277/355 |
| 2002/0130469 A1* | 9/2002 | Kono ............................. 277/355 |
| 2003/0178778 A1* | 9/2003 | Szymbor et al. .............. 277/355 |
| 2006/0038351 A1* | 2/2006 | Rupp et al. .................... 277/355 |

* cited by examiner

*Primary Examiner* — Vishal Patel
(74) *Attorney, Agent, or Firm* — King & Schickli, PLLC

(57) ABSTRACT

A brush seal assembly including a pair of annular plates defining an annular slot between them and a radially outer chamber opening into the slot; and an annular brush seal having bristles and an enlarged portion at its outer periphery formed by welding the bristles together, the brush seal extending through the slot with its enlarged portion retained in the chamber wherein at least a portion of one of the plates has an extension thereof which is deformed over the other plate to hold the plates together to form the assembly characterized in that one of the plates has a flat face in the region of the slot.

18 Claims, 3 Drawing Sheets

BRUSH SEAL ASSEMBLY

This application is a continuation of U.S. patent application Ser. No. 13/020,835, filed on Feb. 4, 2011, now U.S. Pat. No. 8,191,898 which is a continuation of U.S. patent application Ser. No. 12/091,199, filed on Apr. 23, 2008, now U.S. Pat. No. 7,950,671 which claims priority from U.S. Provisional Application Ser. No. 60/849,324, filed on Oct. 4, 2006, and is the national stage of PCT/GB07/003,694, filed Oct. 1, 2007, which claims priority from British Application No. 0619488.0, filed Oct. 3, 2006, the full disclosures of which are incorporated herein by reference.

This invention relates to brush seal assemblies. Brush seals are typically used in, for example, gas turbine engines to seal between a stator and a rotating shaft. The bristles of the brush seal frequently extend between a pair of plates so that their free ends project there from and commonly the bristles and plates are welded into a single assembly. This arrangement enables easy handling and assembly and enables the unit to be provided with a very precise outer diameter. However, in use the bristles become worn and from time to time the seals need replacing. As the plates are made from rather expensive alloys, this can lead to a fairly high cost of ownership for the gas turbine.

In EP-A-0911554A the possibility of clamping the brush seal elements between two plates is shown, but the plates are then held together by their mounting means and this creates problems of assembly and replacement.

According to the present invention there is provided a brush seal assembly including a pair of annular plates defining an annular slot between them and a radially outer chamber opening into the slot; and an annular brush seal having an enlarged portion at its outer periphery, the brush seal extending through the slot with its enlarged portion retained in the chamber wherein at least a portion of one of the plates is deformed over the other plate to hold the plates together to form the assembly characterised in that one of the plates has a flat face in the region of the slot and/or in that the other plate has a portion for squeezing locally the bristles against the flat region to hold the bristles or in that wherein the enlarged portion is asymmetric relative to the bristles.

In one embodiment the one plate is formed by a first leg of an L section member and the extension is formed by the other.

In any embodiment the portion of the one plate may be formed by local deformation and preferably at least two portions are deformed.

Thus typically a number of tabs will be deformed out of an originally annular portion of the extension to locate and hold the two plates together. When the brush seal needs replacing, the tabs can be machined away and a new brush seal inserted. Further tabs can then be formed from previously undeformed portions of the extension. In this way the other plate can be reused over a significant number of repair cycles and the one plate can also be reused until there is insufficient under formed material left to form the deformed portions or tabs.

Thus from another aspect the invention consists in a method of refurbishing a seal as defined above including:
(a) releasing the plates by removing or releasing the portional portions;
(b) inserting a new brush seal; and
(c) deforming at least one different portion of the one plate over the other plate to hold the plates together.

As has already been indicated, it is believed that in most instances the step of removal will need to take place by machining.

It will also be understood that one plate could be deformed around the entire circumference of the extension, if that degree of location was required. In that case the one plate would become sacrificial, but the other plate would still be reusable.

Although the invention has been defined above it is to be understood it includes any inventive combination of the features set out above or in the following description.

The invention may be performed in a number of ways and a specific embodiment will now be described, by way of example, with reference to the accompanying drawings, in which.

Figure 1:
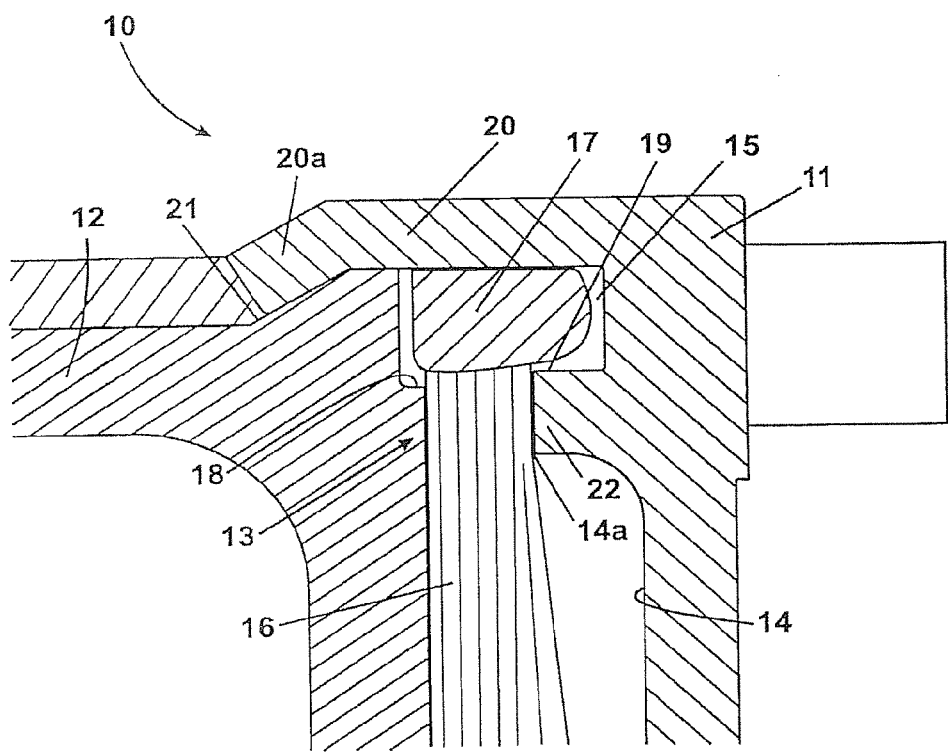
FIG. 1 is a scrap radial cross-section through a portion of an annular brush seal assembly.

Thus a brush seal assembly, generally indicated at 10, includes a front plate 11, a rear plate 12 and a brush seal 13.

The plates define a radially extending slot 14, which is open at its radially inner end (not shown) and an outer peripheral annular chamber 15, which opens into the slot 14. This will reduce machining cost and is particularly made suitable with the clamping feature mentioned below. The bristles 16 of the brush seal 13 are joined together by an enlarged asymmetric root portion 17, formed by welding the ends of the bristles together. The root portion 17 is generally rectangular in section and dimensioned so as not to pass through opening 14a, which forms the peripherally outer portion of the slot 14. It will be noted that seats 18 and 19 are formed in the chamber 15 on either side of the opening 14a so as to prevent the root portion 17 from becoming rotated to the extent that it can be pulled out through the opening 14a.

Each of the plates 11 and 12 are generally L shaped in radial section so that the plate 11 has an annular extension or leg 20 that can be locally deformed inwardly to form tabs 20a that engage on an inclined shoulder 21 formed on the plate 12. This fixing causes a projection 22 on plate 11 to clamp the bristles 16 against the plate 12 by squeezing them against the plate 12. The tabs 20a may conveniently be spaced at approximately 120° intervals.

In due course, when the bristles 16 have become worn, the assembly 10 can be removed from the gas turbine and the tabs 20a machined off to release the assembly. A new brush seal 13 can be inserted and the plates re-engaged by forming new tabs 20a in under formed portions of the leg 20. Eventually a new front plate 11 will need to be provided, but the rear plate can still be recycled. As the alloys from which the plates 11 and 12 are formed are expensive and the seals may typically be a meter or more in diameter, this recycling will significantly reduce the cost of ownership of the brush seal assembly.

Figure 2:
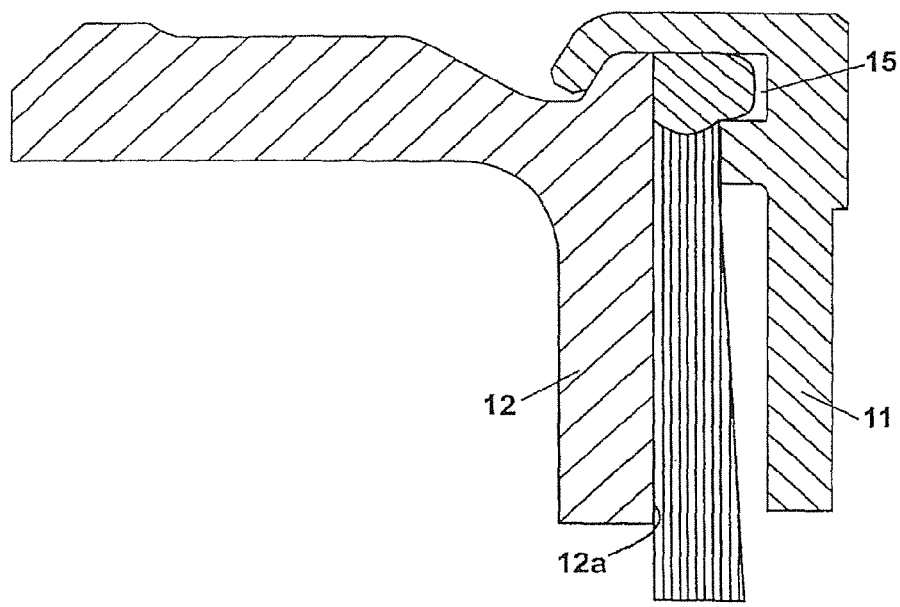
FIG. 2 is a corresponding view of another embodiment.
Figure 3:
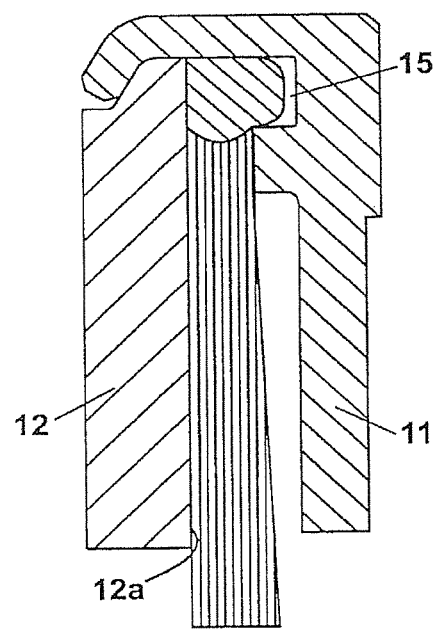
FIG. 3 is a corresponding view of a third embodiment.

FIGS. 2 and 3 illustrate alternative embodiments where a face 12a of the rear plate 12 is flat both in the bristle clamping region and in the region of the slot 14. In these cases the chamber 15 defined by the slot 14 lies entirely within the front plate 11 with the rear plate 12 simply defining one wall. This approach is surprising as it might be thought difficult to retain the brush seal 13. However, the clamping of the bristles makes it particularly efficacious.

It will be appreciated that instead of just having local tabs 20a, the plates 11,12 could be joined together around the entire circumference by spinning over the extension 20.

The invention claimed is:
1. A brush seal assembly comprising:
a first annular plate including a recess, said recess including at least three faces, and further including a projection extending in an axial direction;
a second annular plate including a substantially flat face region located on a radially outer portion of the second plate, the first plate further including at least one retaining element for engaging the second plate to hold the plates together such that the recess of the first plate faces the flat face region of the second plate and forms a radially outer chamber opening into a radially inner annular slot defined by and between the plates; and an annular brush seal having bristles and a root portion, said root portion positioned in the recess at one side and engaged by the flat face region on an opposing side;

wherein the projection directly contacts the bristles, locally squeezing the bristles against the flat face region on the second plate to hold the bristles.

2. The brush seal of claim 1, wherein the root portion is asymmetric.

3. The brush seal of claim 1, wherein the at least one retaining element comprises a plurality of extensions, said extensions engaging the second plate.

4. The brush seal of claim 3, wherein the second plate further comprises an inclined shoulder for engaging the extension.

5. The brush seal of claim 1, wherein a portion of the substantially flat face both engages the root portion and is part of the periphery of the second annular plate.

6. The brush seal assembly of claim 1, wherein the portion of the second plate forming the radially outer chamber consists of the flat face region.

7. The brush seal assembly of claim 1, wherein the radially outer chamber includes a perimeter consisting of the three faces of the recess, the flat face region of the second plate, and a portion of the annular slot opening into the radially outer chamber.

8. The assembly of claim 1, wherein two of the at least three faces of the first annular plate are parallel and face one another; and wherein the annular slot includes parallel and radially extending walls facing one another.

9. The assembly of claim 1, wherein the recess if formed by the entirety of the at least three faces.

10. The assembly of claim 1, wherein one of the at least three faces of the recess at least partially forms a surface of the projection extending in an axial direction.

11. A brush seal assembly comprising:

a pair of annular plates defining an annular slot with generally parallel sides and a radially outer chamber between said plates, one of said plates including at least one extension engaging the other of said plates to form the assembly; and an annular brush seal including bristles that extend through the annular slot, and further including a root portion contained within the radially outer chamber, wherein only one of the plates contains a recess including three faces for forming the chamber, and wherein the chamber is formed at a periphery of the plate without the recess; and wherein the plate with the recess further includes a projection extending in an axial direction, directly contacting the bristles, and locally squeezing the bristles against a flat region on the second plate to hold the bristles.

12. The assembly of claim 11, wherein the other of the plates has a peripheral face opposing the recess.

13. The brush seal of claim 11, wherein the first plate includes the extension.

14. The brush seal of claim 13, wherein the second plate further comprises an inclined shoulder for engaging the extension.

15. The brush seal of claim 11, wherein the plate with the extension engaging the other plate further includes at least one second extension.

16. The brush seal assembly of claim 12, wherein the radially outer chamber includes a perimeter consisting of the three faces of the recess, the peripheral face of the other plate, and a portion of the annular slot opening into the radially outer chamber.

17. A brush seal assembly comprising:

a first L-shaped annular plate with two legs, said plate including a recess with at least three faces and further including a projection extending in an axial direction;

a second L-shaped annular plate including at least one substantially flat face region extending to a radially outer portion of the second plate; and an annular brush seal having bristles and a root portion, said root portion positioned in the recess at one side and engaged by the flat face on an opposing side;

wherein one leg of the first plate engages the second plate to hold the plates together such that the recess of the first plate faces the flat face region of the second plate and forms a radially outer chamber opening into an annular slot defined by and between the plates; and wherein the projection directly contacts the bristles and locally squeezes the bristles against the flat face region on the second L-shaped plate to hold the bristles.

18. The brush seal assembly of claim 17, wherein the radially outer chamber includes a perimeter consisting of three faces of the recess, the substantially flat face region of the second plate, and a portion of the annular slot opening into the radially outer chamber.

* * * * *